United States Patent Office 3,458,457
Patented July 29, 1969

3,458,457
PHOSPHORUS-CONTAINING FLAME RETARDANT POLYURETHANES
James Keith Jacques, Handsworth Wood, Birmingham, England, assignor to Albright & Wilson (Mfg.) Limited, Oldbury, Warwickshire, England, a British company
No Drawing. Filed July 7, 1965, Ser. No. 470,226
Claims priority, application Great Britain, Aug. 6, 1964, 32,081/64
Int. Cl. C08g *34/16, 22/14*
U.S. Cl. 260—2.5      10 Claims

ABSTRACT OF THE DISCLOSURE

The invention provides a flame-resistant polyurethane with at least one polyhydroxy alcohol selected from the group consisting of polyethers and polyesters having a hydroxyl functionality of at least two and with at least one acetodiphosphonic acid having the formula

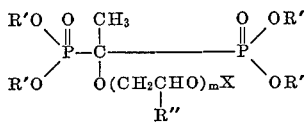

wherein $m$ is a number from 1 to 20, each R' is selected from the group consisting of aliphatic hydrocarbon, substituted aliphatic hydrocarbon, and groups having the formula

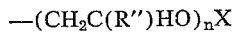

$$-(CH_2C(R'')HO)_nX$$

wherein each $n$ is a number from 1 to 20, X is selected from hydrogen, acyl and alkyl groups, and R'' is selected from the group consisting of hydrogen, methyl and halomethyl groups.

---

This invention relates to flame retardant polymers which are polyurethane materials modified by incorporation therein of certain organophosphorus compound, and to the preparation thereof. By flame retardancy we mean that the polyurethane material has a reduced tendency to burn when ignited by a flame, which is then removed.

Polyurethane materials, particularly those in cellular form (hereinafter termed polyurethane foams) are finding an increasing commercial use particularly in upholstery and for heat and sound insulation, the non-cellular materials finding use as elastomers. However, polyurethane materials suffer from the disadvantage that they are combustible and, to overcome the consequent fire hazard which militates against the acceptance of them for purposes for which their other properties, such as lightness and resiliency, render them eminently suitable, many attempts have been made to render them flame retardant. As the incorporation of solid additives in a foam gives rise to difficulties in providing a homogeneous material and as the presence of ingredients in a polyurethane-producing process, other than the essential organic polyhydroxy compound, organic polyisocyanate and foaming agent (if any), often affects the quality and properties of the resulting product, no single product has yet been found which is completely satisfactory as a flame-retardant agent for polyurethane materials.

It is desirable when modifying polymer materials to employ substances capable of being incorporated directly into the polymer molecule, thereby avoiding rapid loss of the modifying agent from the polymeric material, and rendering the molecule itself flame retardant.

We have now discovered that useful polyurethanes, both cellular and elastomeric, having a measure of flame retardancy may be prepared by the incorporation in the polyurethane molecule of units of the formula

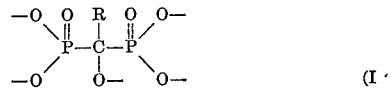

derived from an acyldiphosphonic acid of the formula

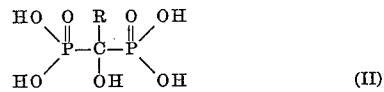

where R is an organic radical.

The acyldiphosphonic acids (II) have four acidic, phosphorus-bonded hydroxyl groups and one carbon-bonded hydroxyl group. The hydroxyl groups may be substituted with various organic radicals, for example by esterification or by condensation with alkylene oxides. These derivatives have in common the possession of one or more hydroxyl groups and are therefore isocyanate-reactive so that when present in the polyurethane-producing reaction mixture they become incorporated into the polyurethane molecule.

As is well known in the art the production of polyurethanes involves the reaction of an organic polyhydroxy compound with an organic polyisocyanate in the presence of one or more catalysts and/or emulsifiers and, when a cellular product is desired, in the presence of a blowing agent which may be water. Our discovery concerns the preparation of a polyurethane involving the incorporation therein of an acyldiphosphonic acid or a hydroxyl-containing derivative thereof.

From one aspect, therefore, our invention provides a polyurethane having, incorporated in the molecules thereof, units of the formula

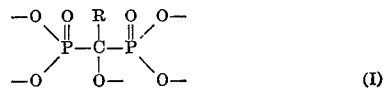

where R is an organic radical.

From a second aspect the invention provides a process for the preparation of a polyurethane wherein an organic polyhydroxy alcohol is reacted with an organic polyisocyanate, optionally in the presence of a blowing agent, characterised in that an acyl diphosphonic acid of the formula

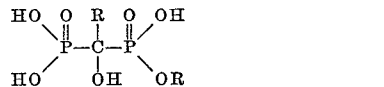

or a hydroxyl-containing ester or alkylene oxide condensate thereof is employed as or in addition to the organic polyhydroxy compound.

The preferred group (I) for use according to our invention is that having R=CH$_3$ derived from acetodiphosphonic acid. Other groups that may conveniently be employed include $$R=ClCH_2—, \quad R=CH_3CH_2—$$
$$R=C_6H_5CH_2—, \quad R=CH_3(CH_2)_4—$$

and other hydrocarbon or halogenated hydrocarbon groups having up to 10 carbon atoms.

It is preferred to incorporate the groups (I) into the polyurethane in the form of a precondensate, prepared by condensing an acyldiphosphonic acid or a partial ester thereof with an alkylene oxide and, optionally, previously or thereafter partially esterifying the hydroxyl groups, for example by reacting the alcoholic hydroxyl groups with an acyl halide or anhydride or reacting the phosphonic acid hydroxyl group with an alkoxide or aroxide.

In general the precondensates have the formula

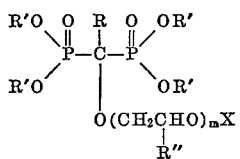

where R is an organic radical, each R' is a hydrocarbon or substituted hydrocarbon group or a group of the formula

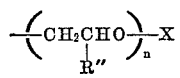

R" is hydrogen, methyl or halomethyl, $n$ is from 1 to 20, $m$ is from 0 to 20, at least one X is hydrogen, any reremaining X groups being either hydrogen or an acyl or alkyl group.

These precondensates react directly with isocyanates to form polyurethanes. They may possess from 1 to 5 hydroxyl groups depending on the degree of acylation, which thus affords an excellent means of controlling the amount of cross-linking in the resulting polymer. For example a non-acylated precondensate having five hydroxyl groups gives a highly cross-linked and therefore rigid product. A tri-acylated precondensate has two hydroxyl groups and tends to form linear polymers of a more flexible character. Precondensates having one hydroxyl group may be employed as "end stoppers" to terminate the polymerisation reaction.

The preferred precondensates for use in the preparation of polyurethanes according to our invention are those derived from propylene oxide which may most conveniently be reacted in proportions of from 5 to 20 moles propylene oxide to 1 mole of acyldiphosphonic acid. Particularly good foams were prepared using a precondensate prepared from 1 mole acetodiphosphonic acid and nine moles propylene oxide. Other alkylene oxide precondensates suitable for use according to the present invention include those prepared from ethylene oxide or epichlorhydrin.

In order to prepare a polyurethane according to our invention, a precondensate as described above may be reacted with a compound possessing two or more isocyanate groups, for example toluene di-isocyanate or diphenylmethane diisocyanate. Preferably the precondensate is mixed with other polyhydric alcohols such as ethylene glycol, glycerol, butane-1,4-diol or with a polyether, polyester or polyesteramide having a hydroxyl functionality of at least two, there being present at least one compound, which may be the precondensate, which is a polyhydroxy compound, and whose molecular weight and hydroxy number are chosen according to the physical properties desired in the resulting polyurethane. The lower the molecular weight of the polyol, the greater will be the rigidity of the resultant polyurethane. For a rigid polymer a polyol having a molecular weight of 200–600 is preferred, while for flexible products it is preferred to employ polyols of molecular weight 1,000 to 6,000. Polyols having molecular weights between the above ranges tend to form semi-rigid polyurethanes. The polyether is preferably a linear polypropylene ether glycol or a condensation product of propylene oxide with a tri-, tetra- or hexa-functional nucleating compound such as glycerol, trimethylol-propane, hexanetriol, pentaerythritol or a hexitol, the glycol or condensation product preferably having a molecular weight in the ranges defined above. Other suitable polyethers include mixed condensation products of propylene and ethylene oxides, either with themselves or with a nucleating compound and polymers of tetrahydrofuran. Examples of various polyethers which may be used are set out in some detail in U.K. specification No. 892,136. The polyesters are normally esters of glycols and/or glycerol, trimethylol-propane or pentaerythritol with dicarboxylic acids such as adipic, phthalic or maleic acids, singly or in admixture. The polyesters have at least 2 free hydroxyl groups and preferably have a hydroxyl functionality of from 2 to 4.

The group (I) may also be incorporated into the polyurethane by preparing a polyester either by reaction of a precondensate of the type described above with a dicarboxylic acid or anhydride such as phthalic, succinic, maleic ar adipic acids or anhydrides, or by reacting an acyldiphosphonic acid or a partial ester thereof with a polyhydric alcohol such as pentaerythritol, ethylene glycol, glycerol or butane-1,4-diol. Such polyesters having at least two hydroxyl groups may then be reacted with a polyisocyanate as described above, if desired in the presence of a non-phosphorus-containing organic polyhydroxy compound.

It is possible to prepare non-foamed polyurethanes by reacting a mixture of an acyldiphosphonic acid and a polyhydroxy compound with a polyisocyanate (the polyhydroxy compound being a polyether, polyester or polyesteramide preferably having a molecular weight of 250 to 6,000), but it is difficult to obtain foams by this process.

In the process of this invention use is made of techniques for producing polyurethane materials in various forms, such as elastomers or foams, which have been described in the literature. Preferably a polyurethane foam is produced by forming a gas from a foaming agent simultaneously with the urethane polymer under such conditions that the polymer is expanded by the gas. The foaming agent for the production of the gas may be a small controlled quantity of water which reacts with isocyanate groups forming carbon dioxide, or a low boiling liquid, for example a fluorinated low molecular weight hydrocarbon, which may be incorporated in the reaction mixture. In the latter case the exothermic nature of the urethane reaction vaporises the liquid and the vapour is utilised to create the necessary expansion. As is well-known the foaming agent may be added either initially (with the other ingredients of the reaction mixture), or subsequently (to a prepolymer prepared from the polyhydric alcohol and the polyisocyanate) optionally together with a further amount of the polyhydroxy compound or polyisocyanate. The foams may be made by continuous or discontinuous mixing methods and may, if desired, be subjected to a heat treatment as an after-cure.

It is preferred to prepare polyurethanes containing sufficient of the groups (I) to provide at least 0.75% by weight of phosphorus in order to achieve the highest degree of flame retardance. Foams have been prepared, having this composition, which were completely non-burning when tested by ASTM D1692–59T. However as little as 0.3% by weight phosphorus has been found to give reproduceably self-extinguishing results in some formulations. Too great a proportion of phosphorus in the polyurethane is best avoided since such polyurethanes tend to be soft and tear very readily. For example a precondensate of nine molar proportions propylene oxide and one molar proportion acetodiphosphonic acid is preferably employed in conjunction with a larger proportion by weight of another polyhydroxy alcohol.

In general polyurethanes containing from 1 to 1.5% by weight of phosphorus give the most satisfactory results.

The production of the polyurethane materials is preferably carried out in the presence of catalysts and/or surface-active agents. Of particular value is the use of tertiary amines and/or organo-tin compounds and/or tin carboxylate salts as catalysts and silicone oils and polysiloxane-polyoxyalkylene copolymers as cell-controlling agents.

The invention is illustrated by the following examples in which all amounts are expressed on a weight basis:

Examples 1–4

Table I illustrates 4 formulations each of which produced a rigid foam which was found to be completely non-burning when tested by the method of ASTM D1692–59T. The ingredients employed were as follows:

A—A mixture of 100 parts glycerol/propylene oxide condensate having a molecular weight of 300, and 10 parts of a pentol of molecular weight 390 formed by condensation of diethylene triamine with propylene oxide, the mixture having a hydroxy number of 570–620.
B—Polysiloxane - oxyalkylene copolymer designated "L520"
C—Dibutyltin dilaurate
D—Diphenylmethane diisocyanate
E—Trichlorofluoromethane
F—Precondensate of 1 mole acetodiphosphonic acid with 9 moles propylene oxide
G—Precondensate of 1 mole acetodiphosphonic acid with 10 moles propylene oxide
H—Precondensate of 1 mole acetodiphosphonic acid with 11 moles epichlorhydrin
I—Precondensate of 1 mole acetodiphosphonic acid with 10 moles ethylene oxide.

TABLE I

| Ingredient | Example 1 | Example 2 | Example 3 | Example 4 |
|---|---|---|---|---|
| A | 12.5 | 15 | 15 | 15 |
| B | 0.5 | 0.5 | 0.5 | 0.5 |
| C | 0.1 | 0.1 | 0.1 | 0.1 |
| D | 41 | 30.5 | 42.5 | 39 |
| E | 10.4 | 10.4 | 10.4 | 10.4 |
| F | 12.5 | | | |
| G | | 10 | | |
| H | | | 10 | |
| I | | | | 10 |

All the above ingredients except the poly-isocyanate were in each case premixed. The isocyanate was rapidly added with vigorous stirring and the reaction mixture was poured into a mould and allowed to foam. Each example provided a satisfactory rigid polyurethane foam which was non-burning.

Examples 1, 5–7

Table II illustrates 4 formulations which demonstrate the effect of varying the proportion of phosphorus in rigid polyurethane foams of the invention.

TABLE II

| Ingredient | Example 1 | Example 5 | Example 6 | Example 7 |
|---|---|---|---|---|
| A | 12.5 | 15 | 17.5 | 20 |
| B | 0.5 | 0.5 | 0.5 | 0.5 |
| C | 0.1 | 0.1 | 0.1 | 0.1 |
| D | 41 | 40.5 | 40 | 39.5 |
| E | 10.4 | 10.4 | 10.4 | 10.4 |
| F | 12.5 | 10.0 | 7.5 | 5 |
| Percent phosphorus | 1.6 | 1.29 | 0.97 | 0.65 |
| Results of ASTM D1692–59T | (1) | (1) | (1) | (2) |

1 Non-burning.
2 Self-extinguishing (2″ burned).

The formulations were made up as described in Example 1.

Example 8

An acetodiphosphonic acid precondensate was prepared by refluxing 2 molar proportions of octanol with 1 molar proportion of acetodiphosphonic acid and 140 to 160° C. followed by vacuum stripping of the excess octanol to form dioctyl acetodiphosphonate. This octyl ester was mixed with 7 molar proportions of propylene oxide and the temperature was raised to 120° C. The resulting dioctyl heptapropoxy acetodiphosphonate had a molecular weight of 836 and contained 7.42% phosphorus.

Using this precondensate the following formulation was prepared by the method of Example 1.

| | Grams |
|---|---|
| Dioctyl heptapropoxy acetodiphosphonate | 20 |
| Propylene oxide/glycerol condensate having a molecular weight about 3000 and hydroxy number 52.7 | 80 |
| Water | 3 |
| B (as in Example I) | 1.3 |
| Triethylene diamine | 0.2 |
| Stannous octoate | 0.4 |
| Toluene diisocyanate | 38.6 |
| (Isocyanate index 105) | |

A non-burning flexible foam was produced.

Example 9

An acetodiphosphonic acid precondensate was prepared by mixing acetodiphosphonic acid with 10 molar proportions of propylene oxide and heating gradually to 120° C. The resulting decapropoxy acetodiphosphonate was acylated with 3 molar proportions of acetyl chloride. The resulting triacyl decapropoxy acetodiphosphonate had a molecular weight of 908 and contains 6.83% phosphorus.

Using this precondensate the following formulation was prepared as described in Example 1.

| | Grams |
|---|---|
| Triacyl decapropoxy acetodisphosphonate | 20 |
| Propylene oxide/glycerol condensate having a molecular weight about 3000 and hydroxy number 52.7 | 80 |
| Water | 3 |
| B (as in Example I) | 1.3 |
| Triethylene diamine | 0.2 |
| Stannous octoate | 0.4 |
| Toluene diisocyanate | 38.1 |
| (Isocyanate index 105) | |

A non-burning flexible foam was produced.

I claim:
1. A flame-resistant polyurethane prepared by reacting at least one organic polyisocyanate with at least one polyhydroxy alcohol selected from the group consisting of polyethers and polyesters having a hydroxyl functionality of at least two and with at least one acetodiphosphonic acid having at least one hydroxyl group of the formula

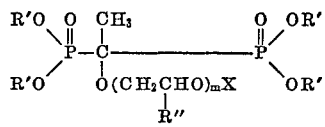

wherein $m$ is a number from 1 to 20, each $R'$ is selected from the group consisting of aliphatic hydrocarbon, and groups having the formula $-(CH_2C(R'')HO)_nX$, wherein each $n$ is a number from 1 to 20, $X$ is selected from hydrogen, and acyl groups, and $R''$ is selected from the group consisting of hydrogen, methyl and halomethyl groups.

2. The polyurethane of claim 1 wherein $R''$ is the methyl group.

3. The polyurethane of claim 2 wherein said acetodiphosphonic acid is prepared by reacting one mole of acetodiphosphonic acid with 9 moles of propylene oxide.

4. The polyurethane of claim 2 wherein said acetodiphosphonic acid is prepared by reacting one mole of acetodiphosphonic acid with 10 moles of propylene oxide.

5. The polyurethane of claim 1 wherein said acetodiphosphonic acid is prepared by reacting acetodiphosphonic acid with epichlorhydrin.

6. The polyurethane of claim 5 wherein said acetodiphosphonic acid and said epichlorhydrin are reacted in a molar ratio of about 1:11.

7. The polyurethane of claim 1 wherein said acetodiphosphonic acid is reacted with ethylene oxide.

8. The polyurethane of claim 7 wherein said acetodiphosphonic acid is reacted with said ethylene oxide in a molar ratio of about 1:10.

9. The polyurethane of claim 1 wherein said acetodiphosphonic acid is the reaction product of acetodiphosphonic acid and propylene oxide which was then acylated with acetyl chloride.

10. The polyurethane of claims 1, 2, 3, 4, 5, 6, 7, 8 or 9 wherein the reaction mixture for the formation of said polyurethane contains a blowing agent whereby the resultant polyurethane is a foamed polyurethane.

References Cited

UNITED STATES PATENTS

| | | | |
|---|---|---|---|
| 2,848,475 | 8/1958 | Schmidt | 260—461 |
| 3,092,651 | 6/1963 | Friedman | 260—461.1 |
| 3,122,417 | 2/1964 | Blaser | 260—207.5 |
| 3,213,129 | 10/1965 | Berth | 23—501 |
| 3,214,454 | 10/1965 | Blaser | 260—429.9 |
| 3,328,493 | 6/1967 | Larrison | 260—929 |

FOREIGN PATENTS 969,547  6/1958  Germany.

DONALD E. CZAJA, Primary Examiner

MICHAEL B. FEIN, Assistant Examiner

U.S. Cl. X.R.

260—75

PO-1050
(5/69)

UNITED STATES PATENT OFFICE
CERTIFICATE OF CORRECTION

Patent No. 3,458,457　　　　　　Dated July 29, 1969

Inventor(s) James Keith Jacques

It is certified that error appears in the above-identified patent and that said Letters Patent are hereby corrected as shown below:

Column 1, lines 8 and 9 should read -- Claims priority, applications Great Britain, Aug. 6, 1964, 32,081/64 and April 15, 1965, 16,298/65 --. Column 2, line 52, that portion of the formula reading "OR" should read -- OH --.

SIGNED AND
SEALED

NOV 25 1969

(SEAL)
Attest:

Edward M. Fletcher, Jr.
Attesting Officer

WILLIAM E. SCHUYLER, JR.
Commissioner of Patents